(12) United States Patent
Kleber et al.

(10) Patent No.: US 9,083,221 B2
(45) Date of Patent: Jul. 14, 2015

(54) ROTOR ASSEMBLY WITH INTEGRAL CAST CONDUCTOR BARS AND FIRST END RINGS AND WELDED SECOND END RINGS AND METHOD OF MANUFACTURING SAME

(75) Inventors: Richard M. Kleber, Clarkston, MI (US); John S. Agapiou, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 282 days.

(21) Appl. No.: 13/112,003

(22) Filed: May 20, 2011

(65) Prior Publication Data

US 2012/0293036 A1 Nov. 22, 2012

(51) Int. Cl.
*H02K 15/02* (2006.01)
*H02K 17/16* (2006.01)
*H02K 15/00* (2006.01)

(52) U.S. Cl.
CPC .......... *H02K 15/0012* (2013.01); *H02K 17/165* (2013.01); *Y10T 29/49012* (2015.01)

(58) Field of Classification Search
CPC ........ H02K 15/02; H02K 15/09; H02K 17/16
USPC ............... 310/156.78–156.79, 211, 212, 182; 29/598, 596, 592.1
See application file for complete search history.

(56) References Cited

U.S. PATENT DOCUMENTS

| | | | | |
|---|---|---|---|---|
| 2,368,295 | A * | 1/1945 | Goran .............................. | 29/598 |
| 4,970,424 | A * | 11/1990 | Nakamura et al. ............ | 310/211 |
| 5,990,595 | A * | 11/1999 | Crowell .................. | 310/216.109 |
| 6,177,750 | B1 * | 1/2001 | Tompkin ................ | 310/216.114 |
| 6,184,606 | B1 * | 2/2001 | Pyrhonen ....................... | 310/211 |
| 6,991,021 | B2 | 1/2006 | Ramirez et al. | |
| 6,998,752 | B2 * | 2/2006 | Yasuhara et al. ............. | 310/211 |
| 2005/0091847 | A1* | 5/2005 | Beneteau et al. ............ | 29/889.1 |
| 2009/0324986 | A1* | 12/2009 | Kleber .......................... | 428/591 |

FOREIGN PATENT DOCUMENTS

JP 1141872 A 2/1999

* cited by examiner

*Primary Examiner* — Michael Andrews
(74) *Attorney, Agent, or Firm* — Quinn Law Group, PLLC

(57) ABSTRACT

A method of manufacturing a rotor assembly includes placing a generally cylindrical rotor core in a die. The rotor core has axial grooves spaced about a perimeter of the rotor core. The grooves may be formed by stacked laminated disks. Material is cast around the annular rotor core in the die such that the cast material forms conductor bars that fill the grooves and first end ring portions at opposing ends of the rotor core connected with the conductor bars. Each of the first end ring portions has substantially a first axial width. The rotor core with cast conductor bars and cast first end ring portions is then removed from the die. A respective second end ring portion is welded to each of the cast first end ring portions to form end ring assemblies. Each second end ring portion has a second axial width greater than the first axial width.

12 Claims, 3 Drawing Sheets

ROTOR ASSEMBLY WITH INTEGRAL CAST CONDUCTOR BARS AND FIRST END RINGS AND WELDED SECOND END RINGS AND METHOD OF MANUFACTURING SAME

TECHNICAL FIELD

The invention relates to a method of manufacturing an induction rotor assembly and an induction rotor assembly manufactured according to the method.

BACKGROUND

An alternating current (AC) induction motor is a particular type of electric motor that uses induced current flow to cause portions of the motor's rotor to become magnetized during operation of the motor. The induced current flows through conductor bars that are parallel to the axis of rotation of the rotor and surround the perimeter of the rotor core.

Known methods of manufacturing induction motor rotors are time consuming and relatively expensive. One common practice is to assemble pre-manufactured conductor bars and shorting rings onto the laminate stack and braze the assembly together. This method is time consuming. Another known method is to die cast the shorting rings and conductor bars together in a mold around the rotor stack. With certain materials, such as copper, die casting is difficult to carry out while maintaining the integrity of the cast components, as copper tends to react with the surfaces of the die. The different volumes of the conductor bars relative to end ring portions may also lead to porosity.

SUMMARY

A method of manufacturing a rotor assembly and a rotor assembly that may be manufactured according to the method are provided. The method includes placing a generally cylindrical rotor core in a die. The rotor core has axial grooves spaced about a perimeter of the rotor core. The grooves may be formed by stacked laminated disks. Material is cast around the annular rotor core in the die such that the cast material forms conductor bars that fill the grooves and first end ring portions at opposing ends of the rotor core connected with the conductor bars. Each of the first end ring portions has substantially a first axial width. The rotor core with cast conductor bars and cast first end ring portions is then removed from the die. A respective second end ring portion is welded to each of the cast first end ring portions to form end ring assemblies. Each second end ring portion has a second axial width greater than the first axial width.

The second end ring portions may be welded to the first end ring portions by spin welding. Spin welding is advantageous in that it enables different materials to be welded to one another. Other weld processes may also be used under the method. Weld beads or flash may be removed by machining For example, friction stir welding, gas metal arc welding, gas tungsten art welding, plasma arc welding, laser beam welding, or electron beam welding may be used. Casting only the conductor bars and the very thin first end ring portions allows for faster filling of the material in the slots of the rotor core, potentially resulting in lower porosity and cracks within the conductor bars. In addition, porosity of the end ring assemblies, especially at the interface of the first end ring portions and the conductor bars, may be reduced. The second end ring portions may be made by several other methods (casting, machining, etc.) to provide a porosity free donut-shape part. The second end ring portions can be attached on the cast lamination stack using a very simple fixture because the conductor bars are already bound to the lamination stack rather than being loose, so no special fixture is required to provide force to hold the loose second end ring portions in the rotor core. Porosity of the cast portions of the rotor assembly is reduced in comparison to a rotor assembly with thicker end portions cast to the conductor bars. Vibration concerns and energy losses due to the allowable clearance among the slots in the rotor core and the conductor bars are eliminated. The die life of the casting process may improve as the axial width of end rings cast to conductor bars is reduced. The casting process of the bars in the lamination stack simplifies the inertial welding process as well, because a relatively simple fixture may be used that holds the rotor core with cast conductor bars and first end ring portions on an outer surface without providing pressure to hold the lamination stack so that both end rings are welded while maintaining a specified pressure on the laminations. This provides a faster cycle time than other assembly methods using inserted conductor bars. The casting process eliminates the extrusion cost of the conductor bars, straightening and cutting to length, and their insertion cost in the slots.

The above features and advantages and other features and advantages of the present invention are readily apparent from the following detailed description of the best modes for carrying out the invention when taken in connection with the accompanying drawings.

DETAILED DESCRIPTION

Figure 1:
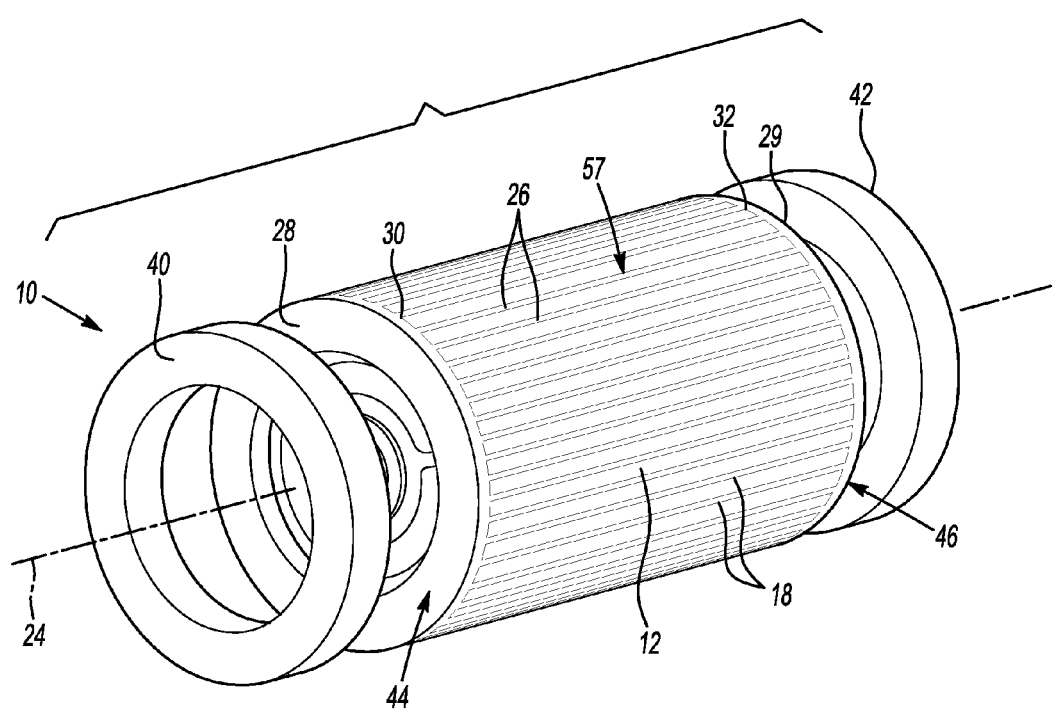
FIG. 1 is a schematic perspective exploded view of a rotor assembly.
Figure 2:
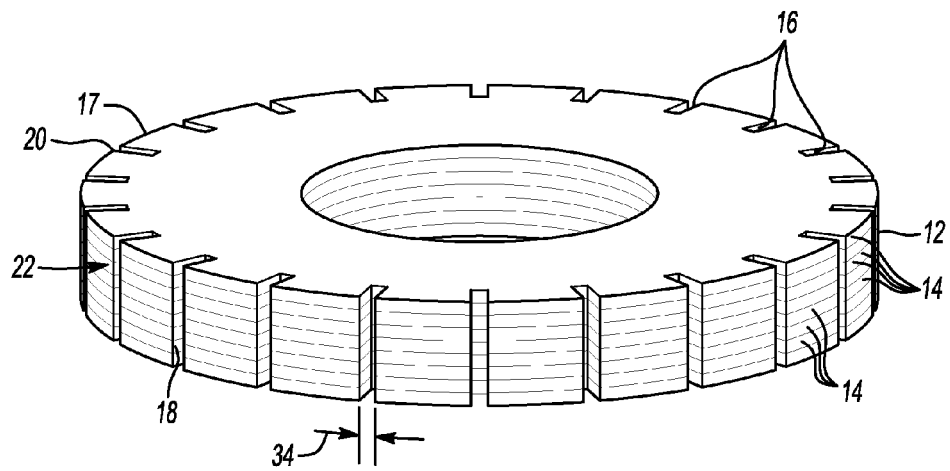
FIG. 2 is a schematic perspective illustration of laminated disks being stacked to form the rotor core of FIG. 1.

Referring to the drawings, wherein like reference numbers refer to like components throughout the several views, FIG. 1 shows an induction rotor assembly 10 in exploded view. The rotor assembly 10 includes a generally cylindrical rotor core 12. The rotor core 12 is a laminate stack of identical thin plates 14, also referred to herein as disks, of highly magnetic steel, as shown in FIG. 2 in which some of the thin plates 14 of the rotor core 12 are shown stacked to partially form the rotor core 12 shown in FIG. 1. Each plate 14 has notches 16 spaced about its periphery 17. When the plates 14 are stacked together, the notches 16 of each plate 14 are aligned with the notches 16 in the adjacent plates 14 to define axial grooves 18 spaced about a periphery 20 of the outer surface 22 of the rotor core 12 and parallel with a center axis which is also an axis of rotation 24 of the rotor assembly 10, shown in FIG. 1. Those of ordinary skill in the art understand how to manufacture a rotor core from stacked thin plates.

Figure 3:
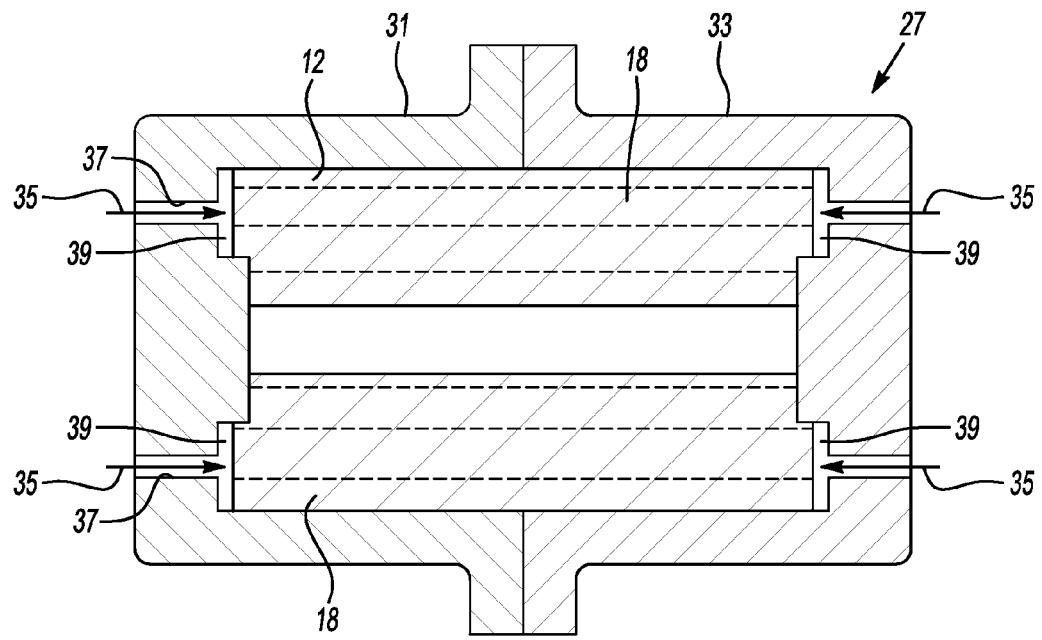
FIG. 3 is a schematic cross sectional illustration of a die in which conductor bars and first end ring portions are cast on the rotor core.

Referring to FIG. 1, the rotor assembly 10 is manufactured by casting material around the rotor core 12 to fill the grooves 18, thereby forming conductor bars 26. The same material also forms first end ring portions 28, 29 that are cast simultaneously with and are unitary with the conductor bars 26 at opposing ends 30, 32 of the conductor bars 26. The first end ring portions 28, 29 thus electrically connect the conductor bars 26 with one another. The conductor bars 26 are substantially encapsulated by the plates 14 in the grooves 18, with the outer faces of the conductor bars 26 exposed. FIG. 3 shows the rotor core 12 placed in a die 27 that has a first die half 31 and a second die half 33. Molten material represented by arrows 35 is placed into the die 27 through inlets 37. The material may be a copper alloy. The material quickly fills the relatively small cavities 39 between the rotor core 12 and the die halves 31, 33 after filling the grooves 18. The material in the cavities 39 forms the first end ring portions 28, 29 and the material in the grooves 18 forms the conductor bars 26 of FIG. 1. In this case, the gates in the die 27 are a closer distance to the grooves 18 resulting in a direct pressure application and fill-up of the grooves 18 with liquid metal. This may allow a reduction in the width of the slots 16 and increase the number of slots 16 around the rotor core 12. Because the cavities 39 are relatively small, they fill with material relatively fast and reduce premature solidification in the grooves 18 that may occur with large cavities necessary for casting thicker end rings. Thus, the material cast in the grooves 18 and the cavities 39 solidifies more uniformly, which may reduce porosity and potential cracking of the conductor bars 26, increasing the integrity of the unitary cast conductor bars 26 and first end ring portions 28, 29. Porosity at the interface of the conductor bars 26 and the first end ring portions 28, 29 is also reduced in comparison to porosity at these interfaces when thicker end ring portions are cast with the conductor bars 26. A reduced porosity improves electrical conductivity and simplifies rotor balancing, which may significantly improve electrical and mechanical performance. The smaller cavities 39 may also increase the life of the die 27 in comparison to filling larger cavities as the molten material in the mold cavities 39 will solidify faster than with larger cavities. The relatively small cavities 39 allow the molten material to cool faster, thus allowing a steady state manufacturing system to run at a lower temperature. Additionally, the molten material has less time to adversely react with or erode the surface material of the die 27 at the mold cavities 39.

Because the conductor bars 26 and the first end ring portions 28, 29 are made integral simply by the casting process, attachment of the second end ring portions 40, 42 is accomplished using a very simple fixture. Because the conductor bars 26 are already bound to the core 12 by the casting, there is no need to align ends of the conductor bars 26 with any slots in the second end ring portion as there is with loose conductor bars in a traditional rotor assembly manufacturing process. Additionally, because the conductor bars 26 are cast to the rotor core 12, any clearance between the bars 26 and the grooves 18 is eliminated and the potential for vibration and resulting noise and energy loss is likewise eliminated.

Figure 5:
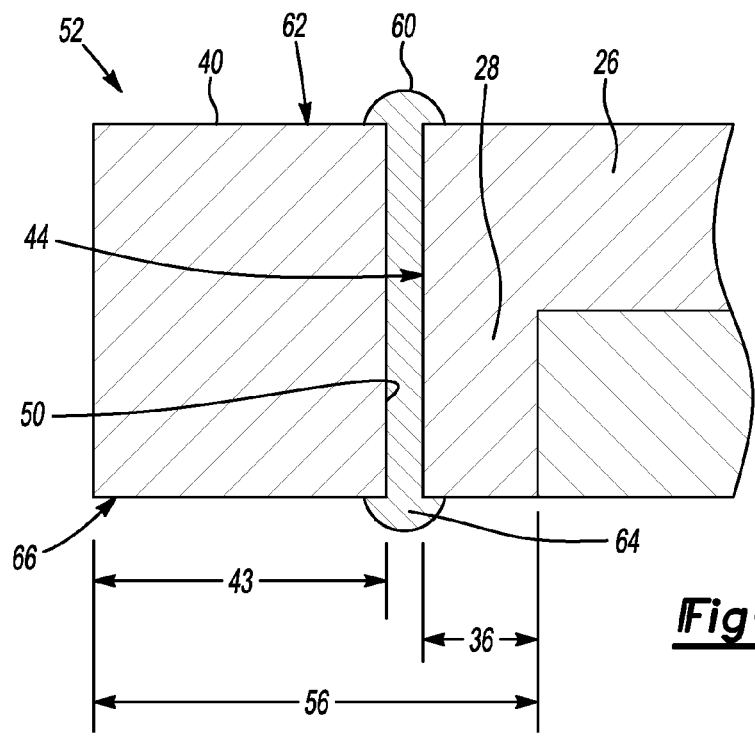
FIG. 5 is a schematic cross-sectional fragmentary illustration of the rotor assembly of FIG. 4 taken at lines 5-5 prior to machining a weld bead.

After casting, the core 12 with cast conductor bars 26 and first end ring portions 28, 29 is removed from the die 27. Referring to FIG. 5, each of the conductor bars 26 has a first thickness 34 that is the same as the thickness of each of the axial grooves 18 as indicated in FIG. 2. The first end ring portions 28, 29 are relatively thin, having a first axial width 36 indicated in FIG. 5. The first end ring portion 29 is also substantially the first axial width 36. The first axial width 36 is substantially the same as the first thickness 34 of the conductor bars 26. Maintaining the relatively thin first axial width 36 of the first end ring portions 28, 29 enables the conductor bars 26 and first end ring portions 28, 29 to be simultaneously cast around the rotor core 12 as further described below.

The first axial width 36 of the first end ring portions 28, 29 is not sufficient for carrying all electrical current flow nor for adequate heat transfer necessary for operation of the rotor assembly 10. Accordingly, second end ring portions 40, 42 are welded to the opposing first end ring portions 28, 29 after the casting of the first end ring portions 28, 29 and conductor bars 26 is completed. The second end ring portions 40, 42 may be cast, forged, or machined from bar stock. The second end ring portions 40, 42 may be the same material as the first end ring portions 28, 29, or may be different materials. Material selection may depend on the weld process used, as discussed below.

The second end ring portions 40, 42 each have a second axial width 43 at least twice as large as the width 36, as indicated in FIG. 5 with respect to second end ring portion 40. Referring to FIG. 1, the second end ring portions 40, 42 are placed against surfaces 44, 46 of the first end ring portions 28, 29 by a fixture (not shown). The second end ring portions 40, 42 are then welded to the first end ring portions 28, 29 by any known welding process. The second end ring portions 40, 42 welded to the first end ring portions 28, 29 are referred to as end ring assemblies 52, 54, each of which has an axial width 56 at least three times the first axial width 36 of the first end ring portions 28, 29, as indicated in FIG. 5. The casting process of the first end ring portions 28, 29 integrally with the conductor bars 26 allows the core 12 to be supported with a relatively simple fixture that holds the core 12 with cast conductor bars 26 and end ring portions 28, 29 at an outer surface 57 indicated in FIG. 1. There is no need for a more complex fixture that is typically used to provide pressure to hold the stacked plates 14 together, the plates 14 are already held together as a unit by the cast conductor bars 26 and end rings 28, 29 as a result of the casting. This provides a faster weld cycle time in comparison to other rotor assembly methods in which bars are simply inserted into grooves in the rotor core.

Figure 4:
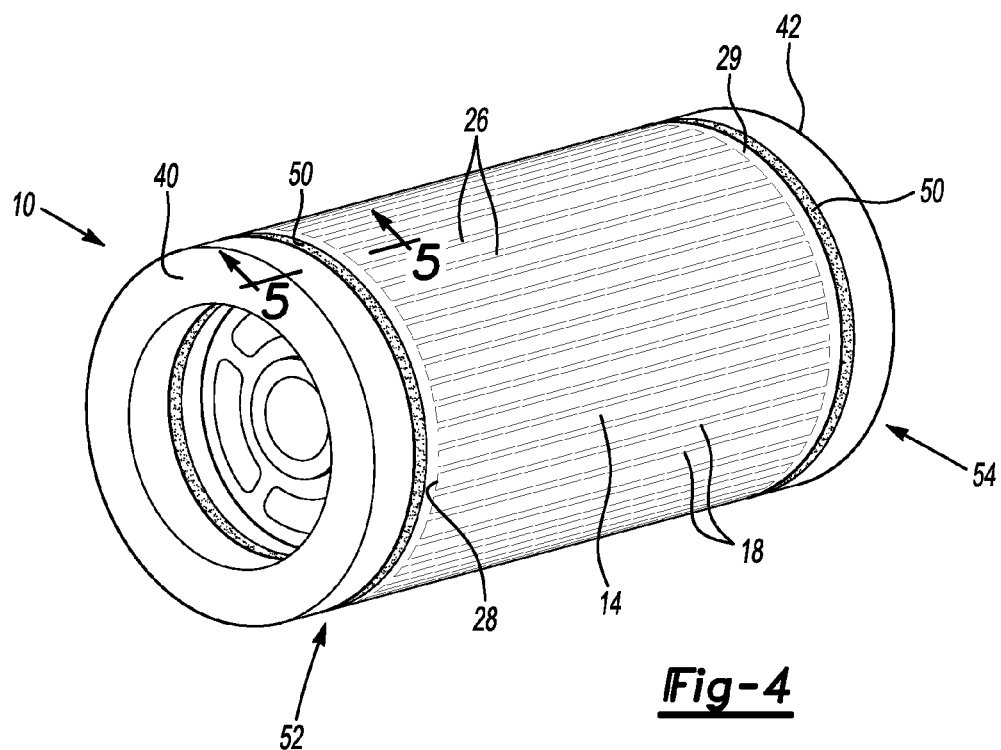
FIG. 4 is a schematic perspective illustration of the completed rotor assembly.

In one embodiment, the second end ring portions 40, 42 are spin welded to the first end ring portions 28, 29. One advantage of spin welding is that the second end ring portions 40, 42 may be dissimilar material than the first end ring portions 28, 29, providing flexibility in the design and characteristics of the rotor assembly 10. During spin welding, the second end ring portions 40, 42 are rotated to be welded to the fixed (i.e., stationary) core 12 with conductor bars 26 and first end ring portions 28, 29. (The end ring rotates while the rotor assembly is stationary). FIGS. 4 and 5 show that spin welding results in a weld region 50 across the entire surface 44 of first end ring portion 28. A weld bead 60, also referred to as weld flash, at an outer surface 62 of the end ring assembly 52 is removed by machining the outer surface 62 by any known method. A weld bead 64 or weld flash at an inner surface 66 of the end ring assembly 52 may also be removed by machining the inner surface 66. Alternately, the weld bead 64 may be left intact to potentially add to the structural integrity of the end ring assembly 52.

Welding of the second end ring portions 40, 42 to first end ring portions 28, 29 may also be accomplished by other known welding processes. For example, friction stir welding, gas metal arc welding, gas tungsten art welding, plasma arc welding, laser beam welding, or electron beam welding may be used. In these instances, welding would be focused at the outer surface 62 and optionally the inner surface 66. The weld region may be more limited to an area at the surfaces 62, 66 and not extend across the entire surface 44 as with spin welding. As with spin welding, removal of one or both weld beads 60, 62 may be accomplished by machining the surfaces 62, 66.

Figure 6:
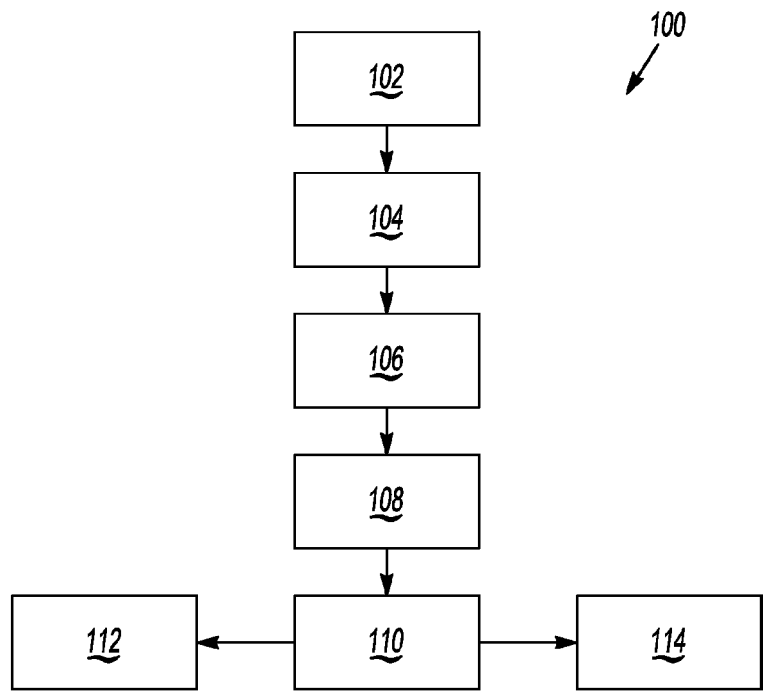
FIG. 6 is a flow diagram of a method of manufacturing the rotor assembly of FIG. 4.

FIG. 6 shows a flow diagram of a method of manufacturing 100 the rotor assembly 10 of FIG. 4. The method 100 includes block 102, stacking laminated disks 14 to form a rotor core 12. In block 104, the rotor core 12 is placed in a die 27. Conductor bars 26 and first end ring portions 28, 29 are then cast around the annular rotor core by placing material, such as a copper alloy, in the die 27 in block 106. The conductor bars 26 fill the grooves 18 of the rotor core 12 and are unitary with the first end ring portions 28, 29. In block 108, the core 12 with cast end ring portions 28, 29 is then removed from the die 27. In block 110, second end ring portions 40, 42 are then welded to the cast first end ring portions 28, 29 to from end ring assemblies 52, 54. The second end ring portions 40, 42 are at least twice as thick as the first end ring portions 28, 29, and may be many times thicker. Weld flash or beads are then machined from outer surfaces 62 of the end ring assemblies 52, 54 in block 112. Optionally, weld flash or beads may be machined from an inner surface 66 of the end ring assemblies 52, 54 in block 114, as discussed above.

While the best modes for carrying out the invention have been described in detail, those familiar with the art to which this invention relates will recognize various alternative designs and embodiments for practicing the invention within the scope of the appended claims.

The invention claimed is:

1. A method of manufacturing a rotor assembly comprising:
    placing a generally cylindrical rotor core in a die; wherein the rotor core is a stack of laminated disks with axial grooves spaced about and open at a radially outer periphery of the stack of laminated disks along an entire axial length of the rotor core;
    casting material around the annular rotor core in the die such that the cast material forms conductor bars that fill the grooves and are exposed at the outer periphery as cast, without machining, and such that the cast material forms first end ring portions that are connected with the conductor bars and in direct contact with opposing end surfaces of the stack of laminated disks; wherein at least a portion of each of the opposing end surfaces of the stack of laminated disks is radially inward of the grooves; wherein each of the first end ring portions has a substantially uniform first axial width;
    removing the rotor core with cast conductor bars and cast first end ring portions from the die;
    welding respective second end ring portions to entire end surfaces of the cast first end ring portions to form end ring assemblies; and wherein each of the second end ring portions has a second axial width greater than the first axial width.

2. The method of claim 1, wherein the welding is spin welding the entire end surfaces of the first end ring portions to entire end surfaces of the second end ring portions.

3. The method of claim 1, wherein the welding is one of friction stir welding, gas metal arc welding, gas tungsten art welding, plasma arc welding, laser beam welding, and electron beam welding.

4. The method of claim 1, further comprising:
    machining a weld bead at an outer surface of the welded end ring portions after the welding.

5. The method of claim 1, further comprising:
    machining a weld bead at an inner surface of the welded end ring portions after the welding.

6. The method of claim 1, wherein the material forming the conductor bars and the first end ring portions is a copper alloy.

7. The method of claim 1, wherein each of the conductor bars has substantially a first thickness; and wherein the first axial width is substantially the same as the first thickness.

8. A method of manufacturing a rotor assembly comprising:
    stacking annular laminated disks to form a rotor core;
    placing the rotor core in a die; wherein the rotor core defines an axis and has grooves spaced about and open at an outer periphery of the rotor core along an entire axial length of the rotor core;
    placing a copper alloy in the die to cast conductor bars and first end ring portions around the annular rotor core such that the conductor bars fill the grooves and are exposed at the outer periphery as cast, without machining, the first end ring portions are at opposing end surfaces of the stacked laminated disks and in direct contact with the end surfaces of the stacked laminated disks, and the conductor bars connect the first end ring portions; wherein each of the first end ring portions is a substantially uniform first axial width;
    removing the rotor core with the cast conductor bars and the cast first end ring portions from the die;
    spin welding entire end surfaces of second end ring portions to the entire end surfaces of the cast first end ring portions to form end ring assemblies each having substantially an axial width at least three times greater than the first axial width; and
    machining weld flash at the second end ring portions.

9. The method of claim 8, wherein each of the conductor bars is substantially a first thickness; and wherein the first axial width is substantially the same as the first thickness.

10. The method of claim 8, wherein the welding is one of friction stir welding, brazing, gas metal arc welding, gas tungsten art welding, plasma arc welding, laser beam welding, and electron beam welding.

11. A rotor assembly comprising:
    an annular rotor core of stacked laminated disks that define an axis and have an outer surface with an outer periphery and grooves spaced about and open at the outer periphery;
    a copper alloy cast in the grooves to define conductor bars exposed at the outer periphery along an entire axial length of the rotor core, as cast without machining and connected with one another and first end ring portions of a substantially uniform first axial width unitary with the conductor bars at opposing end surfaces of the conductor bars and in direct contact with opposing end surfaces of the stacked laminated disks; and
    second end ring portions with end surfaces welded to entire end surfaces of the cast first end ring portions.

12. The rotor assembly of claim 11, wherein each of the conductor bars is substantially a first thickness, wherein the first axial width of the first end portions is substantially the same as the first thickness; and
    wherein each of the second end ring portions is substantially a second axial width at least twice the first axial width.

* * * * *